Nov. 2, 1937.   M. W. REED   2,098,163
ELECTRICAL CABLE
Filed Jan. 2, 1936

Inventor:
MALCOLM W. REED,
by Usina & Rauber
his Attorneys

Patented Nov. 2, 1937

2,098,163

UNITED STATES PATENT OFFICE 2,098,163

ELECTRICAL CABLE

Malcolm W. Reed, Shaker Heights, Ohio, assignor to The American Steel and Wire Company of New Jersey, a corporation of New Jersey Application January 2, 1936, Serial No. 57,297

12 Claims. (Cl. 117—58)

This invention relates to electrical cables, and more particularly those that are composed of one or more stranded conductors which are encased with the usual insulation, lead sheathing and exterior armoring, although not limited thereto.

It is very essential that electrical cables of the type described possess great flexibility and numerous attempts have been made to procure this characteristic by resorting to what are known as "cross-lay constructions", which necessarily reduce the cross-sectional area of the unit as a whole. In addition, there is a decided tendency on the part of the wires to nick one another when the unit is subjected to sharp bending.

In order to increase flexibility without sacrificing cross-sectional area, it has been proposed to construct these electrical cables of a number of small wires which are other than round and in this way reduce the area of the interstices between the wires of the conductor strand. This construction, while serving the purpose to some degree of satisfaction, is extremely expensive and therefore one which has never been widely used.

In merely assembling numerous round wires difficulty is experienced in completely locking those of each layer in order to prevent permanent deformation during bending, or what is known as "bird-caging".

It is one of the objects of the present invention to provide a novel electrical cable which is composed in part of a conductor that will easily withstand severe bending without permanent displacement.

Another object is the provision of a novel electrical cable which eliminates the usual "nicking" which takes place in conventional constructions.

Another object is to provide a novel electrical cable of the type described which not only embodies the foregoing advantages but one which is extremely inexpensive to produce.

These and further objects will be apparent after referring to the drawing, in which.

Figure 1:
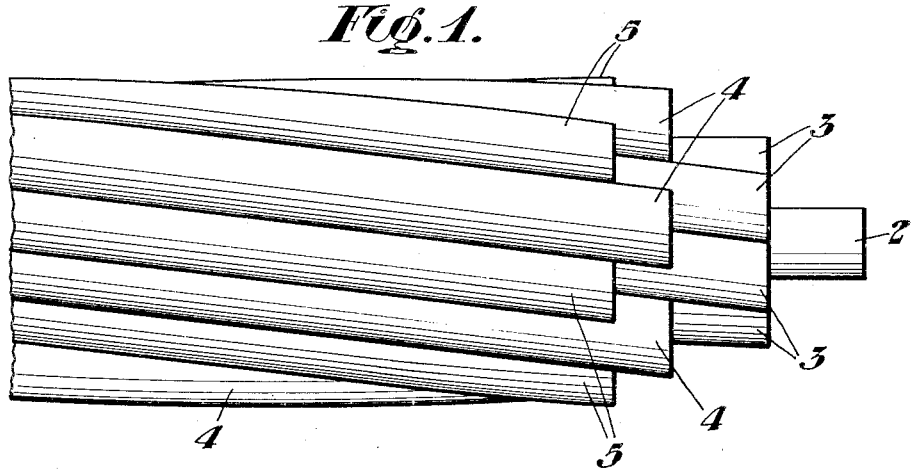
Figure 1 is a side elevation showing the particular manner in which the component elements of the electrical cable of the invention are assembled.

Referring more particularly to the drawing, the numeral 2 designates the core of the electrical cable which is preferably in the form of a single wire of large diameter. This core 2 is surrounded by an intermediate layer of wires 3 which are helically wound in side-by-side relationship. These wires 3 which form this intermediate layer are all slightly smaller in diameter than the core 2.

A plurality of larger wires 4 are helically wound around the intermediate wires 3 in the same direction as are a plurality of intermediately disposed smaller wires 5.

Figure 2:
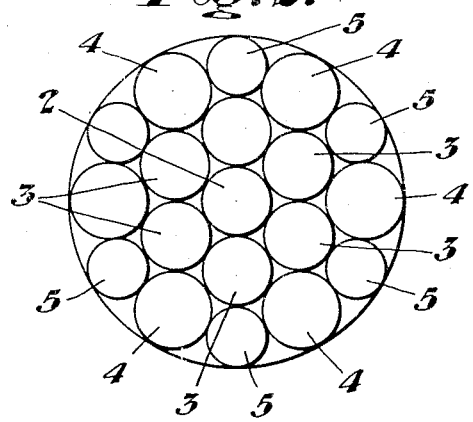
Figure 2 is an end elevation of the cable in Figure 1.

As shown in Figure 2, these smaller wires 5, which are disposed between the large wires 4, are smaller in diameter than either the core 2 or the intermediate wires 3. The sum of the number of the wires 4 and 5 is double that of the total of the wires 3 in the intermediate layer. That is to say, there are six of the wires 4 and six of the wires 5 (making a total of twelve), while the total of the wires 3 therebeneath is six. The wires 4 and 5 are of such relative size as to completely cover the intermediate layer of wires 3 and at the same time have the outer surface describe a true circle.

It is the function of the large wires 4 to lie in the interstices between the wires 3 of the intermediate layer and to be therefore locked firmly in place, while the smaller wires 5 between the large wires 4 of the external layer contact the crowns, or outer surfaces, of the wires 3. The large wires 4 are preferably of the same diameter as that of the core 2, while the wires 5 of the external layer are substantially smaller.

I have found by experiment that an electrical conductor strand having 19 wires stranded in one operation of an outside diameter of 0.33 inch, in which the core wire is .074 inch in diameter, the wires 3 of the intermediate layer .072 inch in diameter, the larger wires 4 of the external layer .074 inch and the smaller wires 5 of the external layer .056 inch in diameter; I am enabled to obtain a volume efficiency, or ratio of actual metal cross-section to total cross-section of conductor, of approximately 84 per cent.

While I have shown and described one specific embodiment of my invention, it will be understood that I do not wish to be limited exactly thereto, since various modifications may be made without departing from the scope of my invention, as defined by the following claims.

I claim:

1. An electrical cable composed of at least one conductor, said conductor comprising a core and a plurality of wires wound helically about the said core in two concentric layers of the same pitch or lay, whereby all of the wires track with each other, the core wire and one-half of the wires of the outer layer of wires being of the same diameter, the wires of the inner layer being smaller in diameter than one-half of the wires of the outer layer and larger in diameter than the other half of the wires of said outer layer.

2. An electrical conductor comprising a core and a plurality of wires wound helically about the said core in two concentric layers of the same pitch or lay, whereby all of the wires track with each other, the core wire and one-half of the wires of the outer layer of wires being of the same diameter, the wires of the inner layer being smaller in diameter than one-half of the wires of the outer layer but larger in diameter than the other half of the wires of the said outer layer.

3. An electric cable composed of at least one conductor, said conductor consisting of not more than 19 wires including a core, the said wires being arranged in two concentric layers of the same pitch or lay about the core, whereby all of the wires track with each other, the wires of the inner layer being smaller in diameter than one-half of the wires of the outer layer but larger in diameter than the other half of the wires of the said outer layer, said conductor having a volume efficiency approaching 85 per cent.

4. An electrical conductor composed of not more than 19 wires including a bore, the said wires being arranged in two concentric layers of the same pitch or lay about the core, whereby all of the wires track with each other, the wires of the inner layer being smaller in diameter than one-half of the wires of the outer layer but larger in diameter than the other half of the wires of the said outer layer, the said conductor having a volume efficiency approaching 85 per cent.

5. An electrical cable composed of at least one conductor, said conductor being composed of a plurality of wires arranged in two concentric layers of the same pitch or lay and wound helically around a core, whereby all of the wires track with each other, the core wire and one-half of the wires of the outer layer being at least .074" in diameter, the wires of the inner layer being at least .072" in diameter and the other half of the wires of the said outer layer being smaller in diameter than the other wires, the said conductor having a volume efficiency approaching 85 per cent.

6. An electrical conductor formed of a plurality of wires arranged in two concentric layers of the same pitch or lay and wound helically around a core whereby all of the wires track with each other, the said core wire and one-half of the wires of the outer layer being at least .074" in diameter, the wires of the inner layer being at least .072" in diameter and the other half of the wires of the said outer layer being smaller in diameter than the other wires, the said conductor having a volume efficiency approaching 85 per cent.

7. An electrical cable composed of at least one conductor, the said conductor comprising a core and a plurality of round wires helically wound about the core wire in two concentric layers of the same pitch or lay, whereby all of the wires track with each other, the wires of the inner layer being smaller in diameter than the core wire, one-half of the wires of the outer layer being the same diameter as the core wire and the other half of the wires of the said outer layer being smaller in diameter than any of the other wires, said conductor having a volume efficiency approaching 85 per cent.

8. An electrical conductor comprising a core and a plurality of round wires helically wound about the core in two concentric layers of the same pitch or lay, whereby all of the wires track with each other, the wires of the inner layer being smaller in diameter than the core wire, one-half of the wires of the outer layer being the same diameter as the core wire and the other half of the wires of the said outer layer being smaller in diameter than any of the other wires, the said conductor having a volume efficiency approaching 85 per cent.

9. An electrical cable composed of at least one conductor, the said conductor comprising a core and a plurality of wires helically wound about the said core wire in two concentric layers of the same pitch or lay so that all of the wires track with each other, the area of each of the wires of the inner layer being less than the area of the core wire, one-half of the wires of the outer layer being each equal in area to the area of the said core wire and the other half of the wires of the said outer layer being each smaller in area than any of the other wires, the said conductor having a volume efficiency approaching 85 per cent.

10. An electrical conductor comprising a core and a plurality of wires helically wound about said core wire in two concentric layers of the same pitch or lay, whereby all of the wires track with each other, the area of each of the wires of the inner layer being less than the area of the core wire, one-half of the wires of the outer layer being each equal in area to the area of the said core wire and the other half of the wires of the said outer layer being each smaller in area than any of the other wires, the said conductor having a volume efficiency approaching 85 per cent.

11. An electrical cable composed of at least one conductor, said conductor comprising a plurality of wires helically wound in two concentric layers of the same pitch or lay around a core, whereby all of the wires track with each other, the area of each of the wires of the inner layer being 95 per cent of the area of the core wire, one-half of the wires of the outer layer being each of the same area as the core wire and the other half of the wires of the said outer layer being each more than 50 per cent of the area of the said core wire, said conductor having a volume efficiency approaching 85 per cent.

12. An electrical conductor comprising a plurality of wires helically wound in two concentric layers of the same pitch or lay around a core, whereby all of the wires track with each other, the area of each of the wires of the inner layer being 95 per cent of the area of the core wire, one-half of the wires of the outer layer being each of the same area as the core wire and the other half of the wires of the said outer layer being each more than 50 per cent of the area of the said core wire, the said conductor having a volume efficiency approaching 85 per cent.

MALCOLM W. REED.